United States Patent [19]

Butler

[11] Patent Number: 4,562,963
[45] Date of Patent: Jan. 7, 1986

[54] GARDEN SPRINKLER

[76] Inventor: Maynard H. Butler, 608 Asharoken Blvd., Bay Shore, N.Y. 11706

[21] Appl. No.: 542,421

[22] Filed: Oct. 17, 1983

[51] Int. Cl.[4] .......................... B05B 1/20; B05B 15/06
[52] U.S. Cl. .................... 239/273; 239/266; 239/565
[58] Field of Search ...................... 239/266–269, 239/273, DIG. 1, DIG. 15, 200, 207, 16, 17, 19, 450, 565

[56] References Cited

U.S. PATENT DOCUMENTS

| | | | |
|---|---|---|---|
| 549,587 | 11/1895 | Schultze | 239/268 |
| 648,263 | 4/1900 | Hull | 239/269 |
| 890,044 | 6/1908 | Godbey | 239/565 |
| 1,914,850 | 6/1933 | Foster | 239/269 |
| 2,240,611 | 5/1941 | Derdeyn | 239/267 |
| 2,770,812 | 11/1956 | Whiteside | 239/289 |

Primary Examiner—Andres Kashnikow
Assistant Examiner—James R. Moon, Jr.
Attorney, Agent, or Firm—Richard L. Miller

[57] ABSTRACT

A garden sprinkler is provided and consists of a hollow tubular frame in an endless closed path that has a first set of inwardly facing apertures along one portion of the frame forming a first spray tube and a second set of inwardly facing apertures along an opposite portion of the frame forming a second spray tube and a device for removably connecting a standard garden hose to the hollow tubular frame. When the hollow tubular frame is placed on a ground surface and water pressure through the garden hose is low the first spray tube and the second spray tube will spray water inside the endless closed path area. When water pressure through the garden hose is high the first spray tube and the second spray tube will overshoot the endless closed path area and spray water to other areas of the ground surface.

2 Claims, 5 Drawing Figures

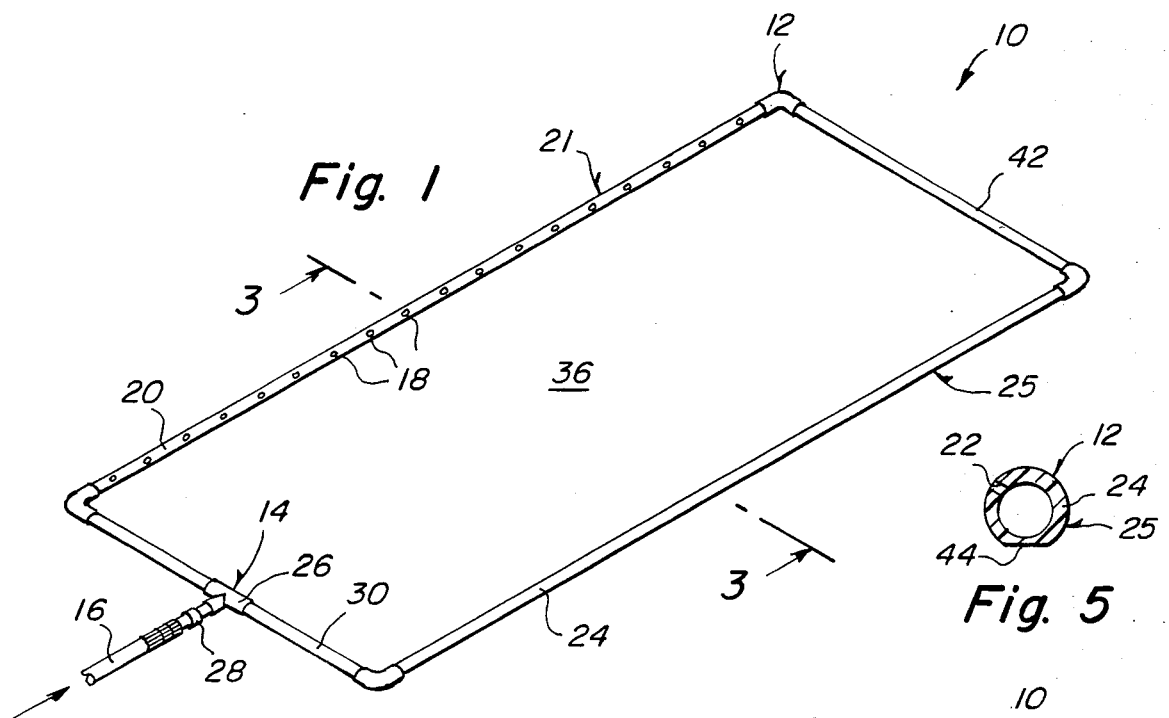
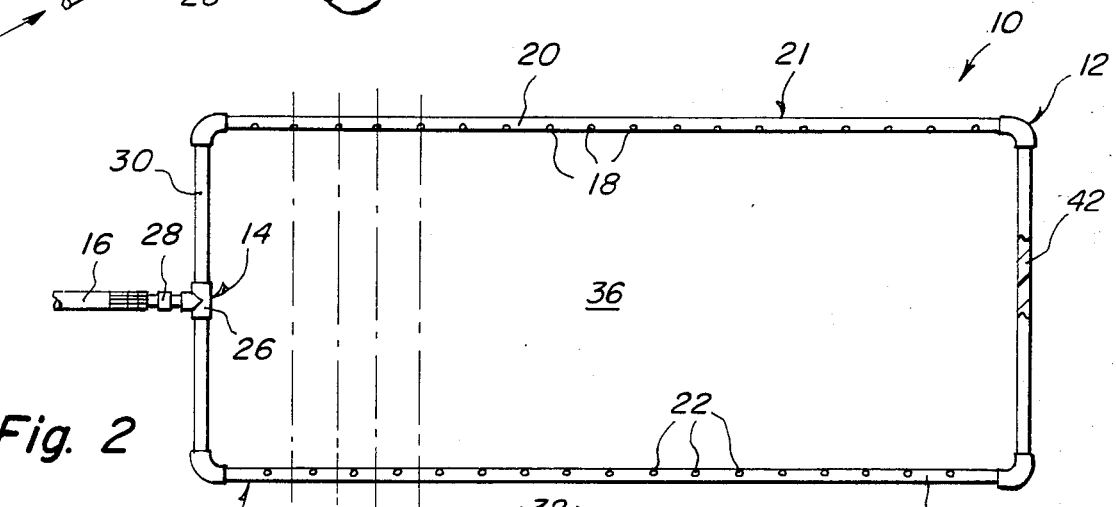
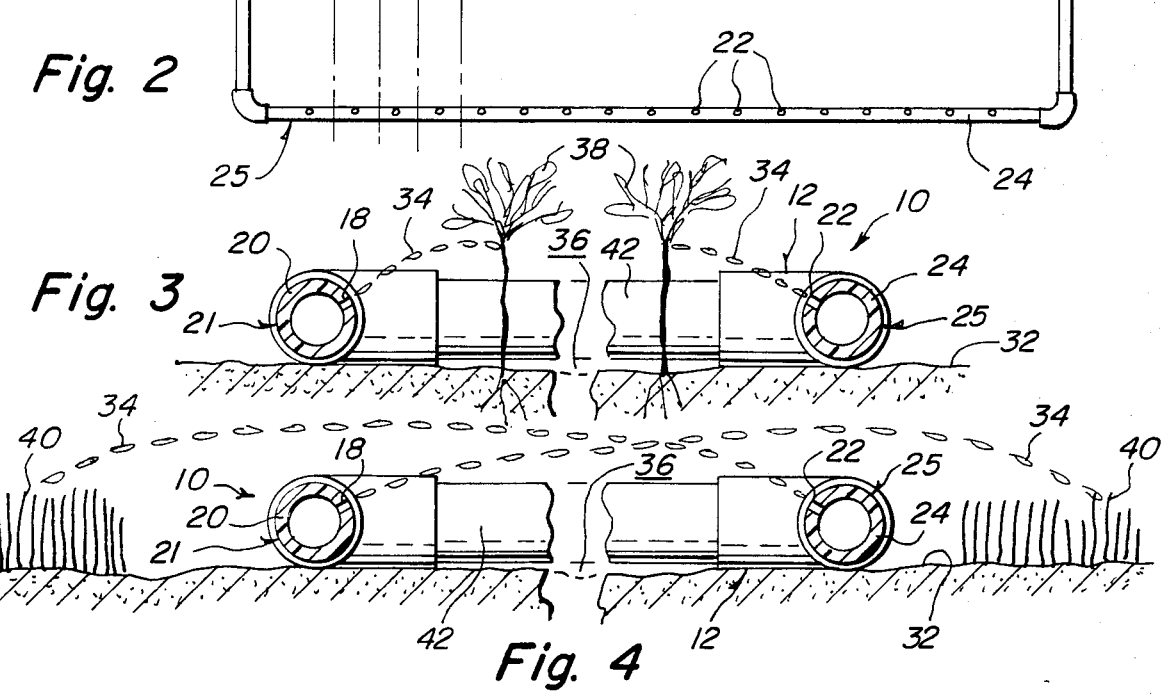
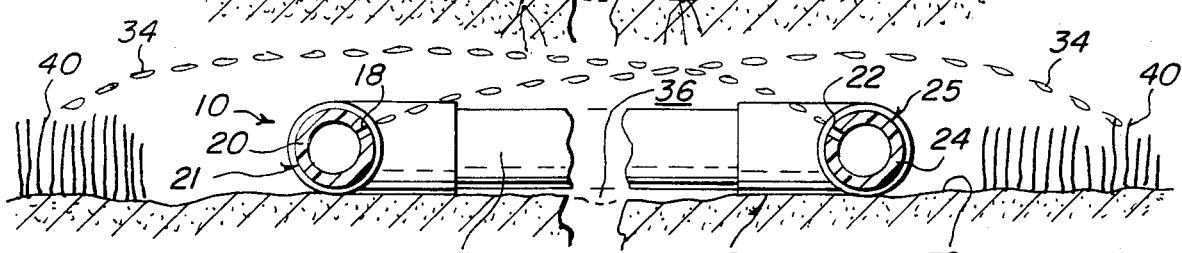

GARDEN SPRINKLER

BACKGROUND OF THE INVENTION

The instant invention relates generally to garden sprinklers and more specifically it relates to a garden sprinkler that is a hollow tubular frame in an endless closed path.

When a person wants to spray water on a lawn or vegetation either a revolving sprinkler, an oscillating lawn sprinkler, a hose nozzle or a pistol nozzle connected to a standard garden hose must be used. While these units may be suitable for the particular purpose to which they address, they would not be as suitable for the purposes of the present invention as heretofore described.

SUMMARY OF THE INVENTION

A principle object of the present invention is to provide a garden sprinkler that is a hollow tubular frame in an endless closed path.

Another object is to provide a garden sprinkler that will spray water inside the endless closed path area when the water pressure is low.

An additional object is to provide a garden sprinkler that will spray water outside the endless closed path area when the water pressure is high.

A further object is to provide a garden sprinkler that is simple and easy to use.

A still further object is to provide a garden sprinkler that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the invention.

FIG. 2 is a top plan view of the invention.

FIG. 3 is a cross sectional view taken on line 3—3 in FIG. 1 showing one use of the invention.

FIG. 4 is a cross sectional view identical to FIG. 3 but showing another use of the invention.

FIG. 5 is a partially cross sectional view of a modification showing a flat on underside of the tube.

DESCRIPTION OF THE PREFERRED EMBODIMENT

Turning now descriptively to the drawings, in which similar reference characters denote similar elements throughout the several views, FIGS. 1 through 4 illustrates a garden sprinkler 10. The sprinkler 10 consists of a hollow tubular frame 12 and a device 14 for removably connecting a standard garden hose 16 to the hollow tubular frame 12.

The hollow tubular frame 12 is an endless closed path that is in the shape of a rectangle. The frame 12 has a first set of inwardly facing apertures 18 along one long arm 20 of the rectangle forming a first spray tube 21 and a second set of inwardly facing apertures 22 along the opposite long arm 24 of the rectangle forming the second spray tube 25. The first set 18 and second set 22 of inwardly facing apertures are at approximately a thirty degree angle with the horizontal and offset from each other to get a maximum spraying coverage available.

The device 14 for removably connecting a standard garden hose 16 to the hollow tubular frame 12 consists of a T-shaped fitting 26 and a female coupling connector 28.

The T-shaped fitting 26 is mounted to center of short arm 30 of the hollow tubular frame 12. The female coupling connector 28 is rotatably mounted to the T-shaped fitting 26 so that the standard garden hose 16 can be connected thereto.

When the hollow tubular frame 12 is placed on a ground surface 32 and water pressure through the garden hose 16 is low the first spray tube 21 and the second spray tube 25 will spray water 34 inside the endless closed path area 36 to vegetation 38 or the like as shown in FIG. 3.

When hollow tubular frame 12 is placed on the ground surface 32 and water pressure through the garden hose 16 is high the first spray tube 21 and the second spray tube 25 will overshoot the endless closed path area 36 and spray water 34 to other areas of the ground surface 32 such as grass 40 or the like, as shown in FIG. 4.

The other short arm 42 of the hollow tubular frame may be solid to uniformly allow the water 34 to exit the first spray tube 21 and second spray tube 25.

In FIG. 5 the hollow tubular frame 12 is in cross section and shows a optional flat area 44 at bottom so that the hollow tubular frame 12 can be placed on the ground surface 32 right side up with the inwardly facing apertures 18 and 22 in the right position.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A garden sprinkler which comprises
   a hollow tubular frame in the shape of a rectangular closed path having a pair of long arms and a pair of short connecting arms, said closed path having a first set of only inwardly facing apertures along one long arm of the rectangle forming a first spray tube and a second set of only inwardly facing apertures along the opposite long arm of the rectangle forming a second spray tube, wherein in the first set and second set of inwardly facing apertures are at approximately a 30 degree angle with the horizontal and offset from each other to get maximum spraying coverage available, the short connecting arms having no spray apertures; and
   (b) means for removably connecting a standard garden hose to a short connecting arm of said tubular frame, the opposing short connecting arm being solid and preventing any flow therethrough so that when said tubular frame is placed on a ground surface and water pressure through the garden hose is low, the spray tube will spray water inside the endless closed path area and when water pressure through the garden hose is high the spray tube will overshoot the closed path area and spray water to the outer areas of the ground surface.

2. A garden sprinkler as recited in claim 1 wherein underside of said hollow tubular frame is flat so that said hollow tubular frame can be placed on the ground surface right side up.

* * * * *